Oct. 17, 1967　　　　　F. A. NELSON　　　　　3,348,137
SPIN DECOUPLING IN GYROMAGNETIC RESONANCE APPARATUS
Filed April 24, 1964
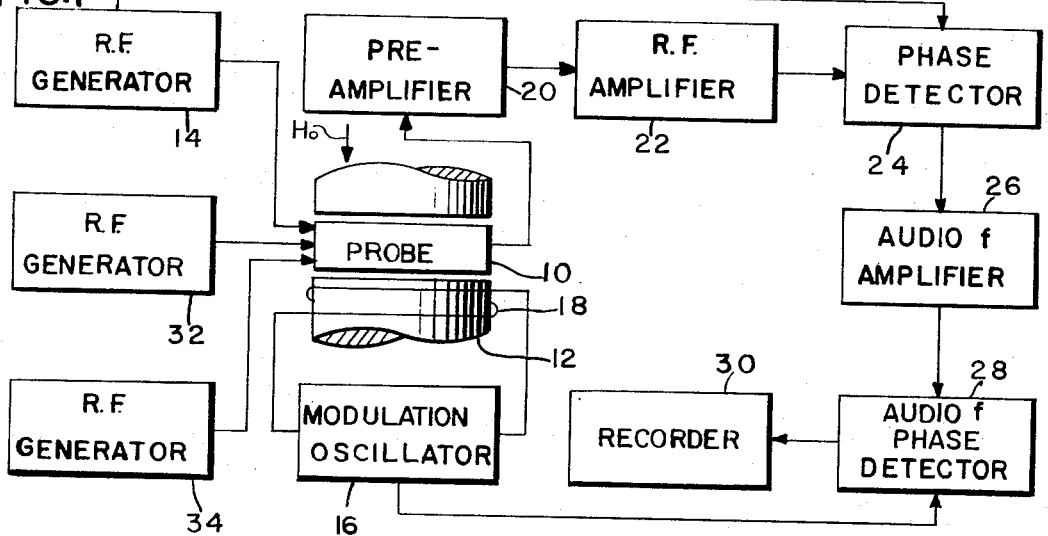
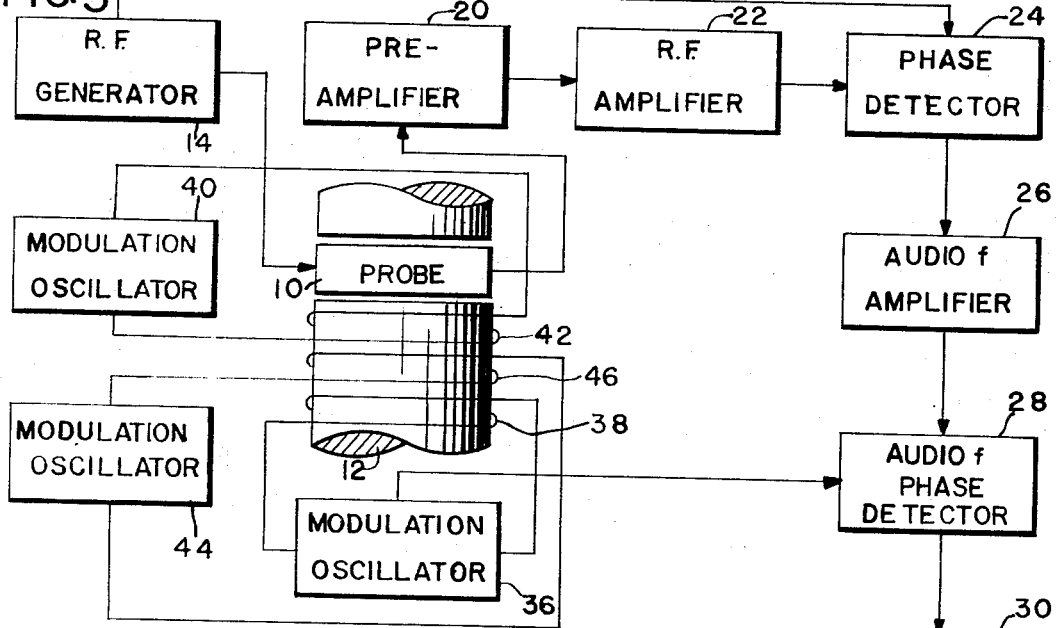
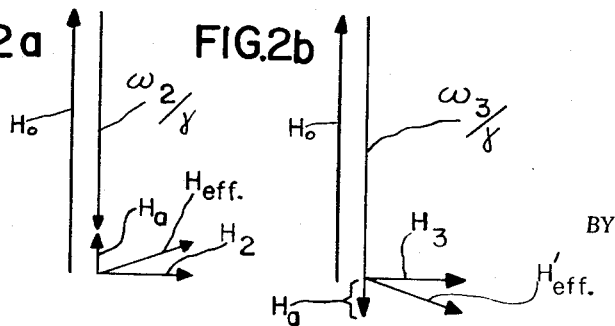
INVENTOR.
FORREST A. NELSON
BY
Wm J. Nolan
ATTORNEY United States Patent Office 3,348,137
Patented Oct. 17, 1967

3,348,137
SPIN DECOUPLING IN GYROMAGNETIC
RESONANCE APPARATUS
Forrest A. Nelson, Palo Alto, Calif., assignor to Varian Associates, Palo Alto, Calif., a corporation of California
Filed Apr. 24, 1964, Ser. No. 362,509
9 Claims. (Cl. 324—.5)

This invention relates to gyromagnetic resonance, and in particular to an improved means for spin decoupling of closely spaced atomic systems.

In one known type of gyromagnetic resonance apparatus, such as a spectrometer, spinning nuclei under observation are oriented at an angle relative to a polarizing magnetic field by means of a radio frequency field applied orthogonally with relation to the polarizing field. As set forth in U.S. Patent 3,068,399, different groups of nuclei may have their spins coupled whereby there is a spin-spin interaction between the different nuclei. As a result, the nuclear resonance lines of the nuclei which are being observed may be split into a doublet or multiplet with separated resonance peaks instead of a single resonance peak. The patented apparatus provides means for disturbing the effect of spin-spin interaction between atom portions of two groups of atom portions so that spin-spin doublet and multiplet resonance lines may be changed or reduced in number.

In the patented apparatus, a radio frequency (R.F.) magnetic field is applied to the atom portions at the frequency of the energy level transitions of the atom portions of a second group, during resonance transitions of the atom portions of a first group. In this way, the spin orientations of the atom portions of the second group are disturbed to effectively disrupt the spin-spin coupling between the two groups.

An improved spin decoupling method is disclosed in U.S. Patent 3,244,968 entitled, "Spin Decoupling of Gyromagnetic Particles," and issued Apr. 5, 1966, in the name of F. Nelson et al., and assigned to the same assignee. This application describes a decoupling apparatus wherein an additional decoupling field is introduced at a frequency substantially equal to the Larmor frequency of the decoupled particles in a magnetic field, and having an amplitude substantially equal to the amplitude of the first decoupling field.

However, in presently known spin decoupling systems the presence of a strong decoupling field $H_2$ at a frequency close to the resonant frequency of the observed group causes both a resonant shift in the frequency of this observed group and a recoupling of the spins. The recoupling occurs because, although the decoupled group has its spin system aligned with $H_2$, the spins of the observed group can also tip or tilt away from $H_0$ as it too precesses along with $H_2$.

An object of this invention is to provide an improved gyromagnetic apparatus wherein spin-spin decoupling is more effectively accomplished.

Another object of this invention is to provide a gyromagnetic apparatus wherein closely spaced spectral groups of atom portions are decoupled without tilting of the atom portions of the group being observed from a desired orientation.

Another object of this invention is to provide a gyromagnetic apparatus wherein shifts in resonant frequency of an observed group of atom portions that result from a decoupling field are effectively negated.

In one embodiment of this invention, a gyromagnetic apparatus comprises a first radio frequency generator for applying a radio frequency magnetic field $H_1$ to the spectral probe, orthogonally relative to a unidirectional field $H_0$, to enable observation of a spin-coupled group of gyromagnetic particles at a frequency $\omega_1$; a second radio frequency frequency generator for applying an alternating magnetic field $H_2$ at a frequency $\omega_2$ to decouple the spin-coupled groups; and a third radio frequency generator for applying a rotating magnetic field $H_3$ at a frequency of $\omega_3$ to compensate for the tipping effect upon the observed gyromagnetic particles caused by the decoupling field $H_2$. The compensating radio frequency magnetic field $H_3$ is of such frequency and magnitude relative to the decoupling field $H_2$ that a condition of symmetry is established with reference to the center frequency $\omega_1$ of the observing field $H_1$. In this way, the spin of the observed atom portions does not precess at either frequency $\omega_2$ or $\omega_3$, but remains polarized in the direction of the field $H_0$; or, when excited by radio frequency field $H_1$, precesses about the field vector $H_0$ at frequency $\omega_1$.

In another embodiment of this invention, a gyromagnetic apparatus including two groups of atom portions in a sample probe incorporates a sideband system comprising first, second and third modulation oscillators. A radio frequency generator provides an alternating signal of frequency $\omega_1$ to the sample probe, and such alternating signal is modulated by the first oscillator at a frequency $\omega m_1$ to develop a sideband, $\omega_1$ to $\omega m_1$, at which the atom portions are observed. This sideband is then frequency modulated by means of the second oscillator at a frequency $\omega m_2$ to achieve decoupling of the atom portions of the two groups. However, decoupling by modulation of the sideband signal develops a tipping effect of the precessing atom portions that are to be observed, with a resultant recoupling of the observed group of atom portions with the secondary group. In keeping with this invention, the third oscillator provides a modulation signal at a frequency $\omega m_3$ to offset the effect of the frequency signal $\omega m_2$ and to compensate for the tipping of the observed atom portions, thereby effectively decoupling the two groups of atom portions.

The invention will be described in greater detail with reference to the drawing in which:

FIG. 1 is a block diagram of a gyromagnetic apparatus, in accordance with this invention;

FIGS. 2a and 2b are vector diagrams which will aid in the explanation of the invention; and FIG. 3 is a block diagram of an alternative embodiment of this invention.

Similar reference numerals refer to similar elements throughout the drawing.

With reference to FIG. 1, a gyromagnetic apparatus, which may be a spectrometer, comprises a spectral probe 10 containing a sample to be analyzed located between the poles of a magnet 12 that provides a polarizing magnetic field $H_0$, which may have a magnitude of 14,000 gauss, for example. A suitable radio frequency generator 14 provides a radio frequency signal to a coil within the probe 10 at the Larmor frequency $\omega_1$ of the atom portions or nuclei under investigation, which may be 60 mc./sec., for example. The radio frequency generator 14 produces a relatively weak alternating field $H_1$, say about 0.1 milligauss, that is perpendicular to the polarizing field $H_0$, thereby causing the nuclei to change their orientation in the polarizing field. A modulation oscillator 16 provides a low frequency current to a bias coil 18 that encompasses the sample, thereby modulating the polarizing magnetic field $H_0$ at the sample and causing the region of resonance of the nuclei to be swept repeatedly.

The alternating field produced by the precessing nuclei induces a voltage in a pickup coil, which voltage is transmitted to a preamplifier 20 and thence to a radio frequency amplifier 22. The amplified signal is fed to a phase detector 24 simultaneously with the R.F signal from the generator 14 to obtain a low frequency or audio output at the modulation frequency, which may be 2,000 cycles per second, by way of example. The audio output is then amplified by an audio frequency amplifier 26, and the amplified signal is passed to an audio frequency phase detector 28. The audio frequency phase detector 28 receives a component of the modulating signal from the oscillator 16 which is compared with the audio output to obtain a D.C. signal. This D.C. signal is recorded by a a recorder 30, which displays amplitude variations as a spectral trace of the atomic group under observation.

As disclosed in the aforementioned U.S. Patent 3,244,-968, a strong alternating field $H_2$ is applied perpendicularly relative to $H_0$ by means of an R.F. generator 32, which is coupled to the coil of the probe 10. The R.F field $H_2$ has a frequency in the vicinity of the Larmor frequency, such as 60 mc./sec., plus 100 cycles per second, and may have a magnitude of 5 milligauss, for example. This strong field $H_2$ effectively decouples the secondary nuclei from the nuclei of the observed group.

With reference to FIG. 2a, which represents the rotating frame of reference of $\omega_2$, the atom portions which are at exact resonance with the alternating field $H_2$ see no effective $H_0$ field and are polarized along the $H_2$ field which is at right angles to the polarizing field $H_0$. Since the resonant atom portions now have no static component of spin in the $H_0$ direction they are decoupled from neighboring atom portions aligned with $H_0$. However, if the neighboring atom portions are close to resonance with $\omega_2$, they align with vector sum $H_{eff}$, which is the vector sum of $H_a$ and $H_2$, $H_a$ being $$H_0 - \frac{\omega_2}{\gamma}$$

where $\gamma$ is the gyromagnetic ratio of the atom portions. The result is that although field $H_2$ aligns a first group in its direction, a neighboring group to be observed may be aligned with $H_{eff}$ which also will have a component that is statically coupled to the first group as a result of the coherent precession of both groups. After the condition of optimum decoupling is reached, any substantial increase in $H_2$ field strength will tend to recouple the atom portions of the two groups. In other words, as the angle between vectors $H_{eff}$ and $H_2$ become smaller, the spin coupling between the groups aligned with $H_{eff}$ and $H_2$ become greater. It should be noted that as the magnitude of vector $H_{eff}$ relative to vector $H_a$ is varied, a shift in the resonant frequency of the observed group occurs.

In accordance with one embodiment of this invention, a third radio frequency generator 34 is utilized to supply a compensating magnetic field $H_3$, illustrated in FIG. 2b, to the coil of the probe 10 at a frequency and magnitude that cancels the resonance of the observed group with $H_{eff}$ field, thereby effectively eliminating the undesirable tipping of the observed nuclei toward the $H_2$ vector. The field $H_3$ may have a magnitude of 5 milligauss, the same as $H_2$ and a frequency $\omega_3$ of 60 mc.–100 cycles per second. It is understood that $\omega_3$ may be of different magnitude and frequency than these values given by way of example, but in any event would supply a balancing and compensating field $H'_{eff}$ that opposes the tipping action of the decoupling field $H_2$ upon the observed group. In this manner, substantially improved spin decoupling of the secondary group from the observed group is achieved. Also, with a suitable magnitude and frequency of $H_3$, the resonant frequency of the observed group may be shifted back to its original position as a result of eliminating the $H_2$ effect on line position.

Another embodiment of this invention is depicted in FIG. 3, wherein only a single radio frequency generator 14 is used to supply an alternating field $H_1$ at a frequency $\omega_1$ for the purpose of orienting the atom portions in the polarizing field $H_0$. A first modulation oscillator 36 generates a signal having a frequency $\omega m_1$ that is applied through a coil 38 to the sample, whereby a sideband signal $\omega_1 \pm \omega m_1$ is produced at which sideband frequency the atom portions of interest are observed. A second modulation oscillator 40 supplies a modulation signal through a coil 42 of frequency $\omega m_2$ and of sufficient amplitude to cause decoupling of atom portions of the two different groups contained in the sample. This modulation, however, produces the same tipping effect that was experienced with the introduction of the decoupling field $H_2$ supplied by the radio frequency generator 32 in the embodiment of FIG. 1. Therefore, in order to compensate for such tipping effect, a third modulation oscillator 44 is utilized to provide a compensating signal at frequency $\omega m_3$ through a coil 46 and serves to effectively decouple the atom portions of the two groups.

In an example of a sideband system utilizing the inventive concept, the radio frequency generator was operated at 60 mc./sec., the modulation oscillator 36 utilized a 5 kc./sec. signal which resulted in a 60,005 kc./sec. sideband at which the atom portions of interest were to be observed. The modulation oscillator 40 provided a signal of 5100 cycles per second whereby a sideband signal of 60,005.1 kc./sec. resulted for decoupling purposes. A compensating signal of 4900 cycles per second derived from modulation oscillator 44 developed a 60,004.9 kc./sec. signal. This compensating signal served to balance the decoupling signal so that the atom portions to be observed were substantially aligned in the $H_0$ field. In this manner, an improved decoupling was realized with a resultant improvement in resolution of the observed spectral trace.

The gyromagnetic apparatus of this invention is not limited to the particular configuration or parameters set forth above. For example, the compensating field $H_3$ which produces $H'_{eff}$ may be derived as a sideband of $H_2$ at a frequency twice that of field modulation. Thus, $H_2$ and $H_3$ would serve to effectively decouple the secondary group. A differential gain control could be used to vary $H_2$ and $H_3$ yet leave the combined decoupling effect constant. At a particular value of $H_2$ and $H_3$, compensation for the effective $H_2$ and $H_3$ action upon the group being observed would be accomplished. If two groups of nuclei are being decoupled simultaneously by two $H_2$ fields at separate frequencies, only one $H_3$ compensating field is necessary.

Furthermore, the apparatus may comprise a combination of the radio frequency generators used in the embodiment of FIG. 1 and the modulation oscillators used in FIG. 3. Also, the invention could be practiced without the audio frequency phase detector, the modulation oscillator coupled to such audio frequency phase detector, and the audio frequency amplifier, wherein the output from the phase detector 24 would be fed directly to the recorder. Therefore, it is apparent that the apparatus described herein may be modified in several ways without departing from the scope of the invention.

What is claimed is:

1. A gyromagnetic apparatus comprising: a probe containing a sample of a first group of atom portions to be observed and a second group of atom portions; means for applying a polarizing magnetic field to said sample; first radio frequency field means for applying to said sample an alternating magnetic field at a frequency $\omega_1$, substantially equal to the Larmor frequency of said first group in said polarizing field for aligning the first group in an orbital plane substantially perpendicular to the polarizing field; means including a modulation oscillator for modulating the polarizing field; means including amplifying means coupled to the probe for obtaining a resonance signal from said probe; phase detector means coupled to said amplifier means and to said first radio frequency field means to provide an audio frequency output signal as a measure of said resonance signal; an audio frequency phase detector coupled to said phase detector means and to said modulation oscillator for producing a D.C. voltage; means for recording said D.C. voltage; second radio frequency field means for applying to said sample an alternating magnetic field at a frequency $\omega_2$ substantially equal to the Larmor frequency of said second group in said polarizing field for spin decoupling the atom portions of the second group from the atom portions of the first group; and third radio frequency field means for applying to said sample an alternating magnetic field at a frequency $\omega_3$ for compensating for the tilting effect of the second radio frequency decoupling means on the first group, and for preventing recoupling of the spins of said two groups said frequencies $\omega_2$ and $\omega_3$ being selected so that $\omega_1$ is between $\omega_2$ and $\omega_3$.

2. Apparatus for decoupling the spins of a second group of gyromagnetic atom portions from the spins of a first group of gyromagnetic atom portions in a sample containing at least said first and second groups in a polarizing unidirectional magnetic field comprising: means for applying to said sample a first alternating magnetic field having a frequency $\omega_1$ substantially that of the resonance frequency of said first group in said unidirectional field to produce gyromagnetic resonance; means for detecting the gyromagnetic resonance of such first group; means for applying a second alternating magnetic field to said sample at a frequency $\omega_2$ substantially equal to the resonance frequency of said second group of atom portions in said unidirectional field to produce a decoupling between the spins of the two groups; and means for applying a third alternating magnetic field to said sample at a frequency $\omega_3$ and magnitude adapted to balance out the effect that the second alternating magnetic field exerts on the alignment and precession of the first group of atom portions in said polarizing magnetic field said frequencies $\omega_2$ and $\omega_3$ being selected so that $\omega_1$ lies between $\omega_2$ and $\omega_3$.

3. The apparatus of claim 2 wherein said groups of atom portions are each nuclei.

4. The apparatus of claim 2 wherein said three alternating magnetic fields are radio frequency fields, said second and third radio frequency fields having amplitudes greater than said first radio frequency field and having frequency values which fall on opposite sides of the frequency value of said first radio frequency field.

5. The apparatus of claim 4 wherein said second and third radio frequency fields have substantially equal values of magnitude and differ in frequency value from said first radio frequency magnetic field by substantially equal frequencies.

6. The apparatus as claimed in claim 2 wherein at least one of said alternating magnetic fields is produced by a radio frequency generator means and at least one of the other alternating magnetic fields is produced by an alternating frequency modulation of said polarizing magnetic field.

7. Apparatus for decoupling the spins of a second group of gyromagnetic atom portions from the spins of a first group of nuclei in a sample containing at least said first and second groups in a polarizing unidirectional magnetic field comprising: means for applying to said sample a first alternating magnetic field having a frequency substantially that of the resonance frequency of said first group in said unidirectional field to produce magnetic resonance of the nuclei in said first group; means for detecting the magnetic resonance of such first group of nuclei; means for applying a second alternating magnetic field to said sample with a magnitude stronger than the magnitude of said first alternating magnetic field and at a frequency substantially equal to the resonance frequency of said second group of nuclei in said unidirectional field to produce a decoupling between the spins of the two groups of nuclei; and means for applying a third alternating magnetic field to said sample at a frequency and amplitude adapted to balance out the effect that the second alternating magnetic field exerted on the alignment of the first group of nuclei in said polarizing magnetic field, the value of the frequency of said first alternating magnetic field being between the values of the frequency of said second and third alternating magnetic fields.

8. The apparatus of claim 7 wherein said second and third alternating frequency magnetic fields have substantially equal values of magnitude and differ in frequency value from said first alternating frequency magnetic field by substantially equal frequencies.

9. The apparatus as claimed in claim 7 wherein at least one of said alternating magnetic fields is produced by a radio frequency generator means and at least one of the other alternating magnetic fields is produced by an alternating frequency modulation of said polarizing magnetic field.

References Cited

UNITED STATES PATENTS

| | | | |
|---|---|---|---|
| 3,068,399 | 12/1962 | Bloch et al. | 324—.5 |
| 3,244,968 | 4/1966 | Nelson et al. | 324—.5 |

OTHER REFERENCES

Freeman et al.: Proceedings of the Physical Society of London, vol. 79, April 1962, pp. 794 to 807 incl. Copy in Patent Office Scientific Library (QC–1–P5).

Beringer et al.: Physical Review, vol. 95, No. 6, September 1954, pp. 1474 to 1481 incl., copy in Patent Office Scientific Library (QC–1–P–4).

Anderson et al.: Physical Review, vol. 116, No. 1, Oct. 1, 1959, pp. 87 to 98 incl., copy in Patent Office Scientific Library (QC–1–P4).

Journal of Molecular Spectroscopy, vol. 11, 1963, pp. 440 to 453 (Nageswara et al.) and pp. 454 to 463 (Raynar et al.), copy in Group 220 of the Patent Office, 324–0.5(D).

RUDOLPH V. ROLINEC, *Primary Examiner.*

WALTER L. CARLSON, MAYNARD R. WILBUR, M. F. LYNCH, *Examiners.*